United States Patent
Lussier

(10) Patent No.: US 12,304,039 B2
(45) Date of Patent: May 20, 2025

(54) AXLE REMOVAL TOOL AND METHOD

(71) Applicant: CatchJak Inc., Wilmington, DE (US)

(72) Inventor: Chad Lussier, Wilmington, DE (US)

(73) Assignee: CatchJak Inc., Wilmington, DE (US)

( * ) Notice: Subject to any disclaimer, the term of this patent is extended or adjusted under 35 U.S.C. 154(b) by 0 days.

(21) Appl. No.: 18/408,686

(22) Filed: Jan. 10, 2024

(65) Prior Publication Data

US 2024/0149412 A1    May 9, 2024

(51) Int. Cl.
| | |
|---|---|
| *B25B 27/00* | (2006.01) |
| *B23P 11/02* | (2006.01) |
| *B25B 27/02* | (2006.01) |
| *B66F 3/35* | (2006.01) |

(52) U.S. Cl.
CPC ........ *B25B 27/0035* (2013.01); *B25B 27/026* (2013.01); *B23P 11/02* (2013.01); *B66F 3/35* (2013.01)

(58) Field of Classification Search
CPC ... B25B 27/0035; B25B 27/02; B25B 27/026; B25B 27/14; B25B 28/00; B23P 11/00; B23P 11/02; B23P 19/02; B23P 19/025; B23P 19/027; B66F 3/247; B66F 3/35; B66F 3/40
See application file for complete search history.

(56) References Cited

U.S. PATENT DOCUMENTS

| | | | | |
|---|---|---|---|---|
| 1,448,728 A * | 3/1923 | Clotworthy | ............. | B60Q 1/36 116/39 |
| 2,068,184 A | 1/1937 | Knopp | | |
| 2,482,031 A * | 9/1949 | Rose | ........................ | H04N 5/65 359/449 |
| 2,804,118 A * | 8/1957 | Bayerkohler | ............ | B21D 1/08 187/250 |
| 4,965,921 A | 10/1990 | Priest | | |
| 5,158,123 A * | 10/1992 | Senko | ..................... | B67C 11/02 220/666 |
| 5,544,402 A | 8/1996 | O'Neil | | |
| 5,819,389 A * | 10/1998 | Knutsen | .................. | F16L 13/11 29/239 |
| 7,043,809 B1 | 5/2006 | Latiri | | |
| 7,963,012 B1 * | 6/2011 | Brasher | .................. | A63B 60/06 29/244 |
| 7,996,972 B2 | 8/2011 | Hu | | |
| 8,978,221 B1 | 3/2015 | Somerville et al. | | |
| 2003/0140493 A1 * | 7/2003 | McFarland | ............ | B25B 27/14 29/23.51 |

(Continued)

FOREIGN PATENT DOCUMENTS

| | | |
|---|---|---|
| CN | 109291003 B | 3/2020 |
| CN | 109571358 B | 10/2023 |
| DE | 102010049788 A1 | 5/2012 |

(Continued)

*Primary Examiner* — Matthew P Travers

(74) *Attorney, Agent, or Firm* — Rogowski Law LLC

(57) ABSTRACT

An axle removal tool uses compressed air or other inert gas to push apart two U- or C- or V-shaped plates installed partially around the CV axle between a CV axle mount and a transaxle spline. The gas inflates a bellows or bladder sandwiched between the plates. As the plates are pushed apart, the CV axle mount is pushed axially away from the transaxle spline, overcoming the C-clip locking the CV axle mount to the transaxle spline.

11 Claims, 6 Drawing Sheets

(56) References Cited

U.S. PATENT DOCUMENTS

2021/0140487 A1\* 5/2021 Dutkiewicz ........... B25B 27/026
2024/0131640 A1\* 4/2024 Brangers ................. B25B 27/28

FOREIGN PATENT DOCUMENTS

| EP | 1690700 A1 | 8/2006 |
| EP | 3120969 A1 | 1/2017 |
| KR | 200141621 | 9/1998 |
| RU | 178177 U1 | 3/2018 |
| WO | 2016108365 A1 | 7/2016 |

\* cited by examiner

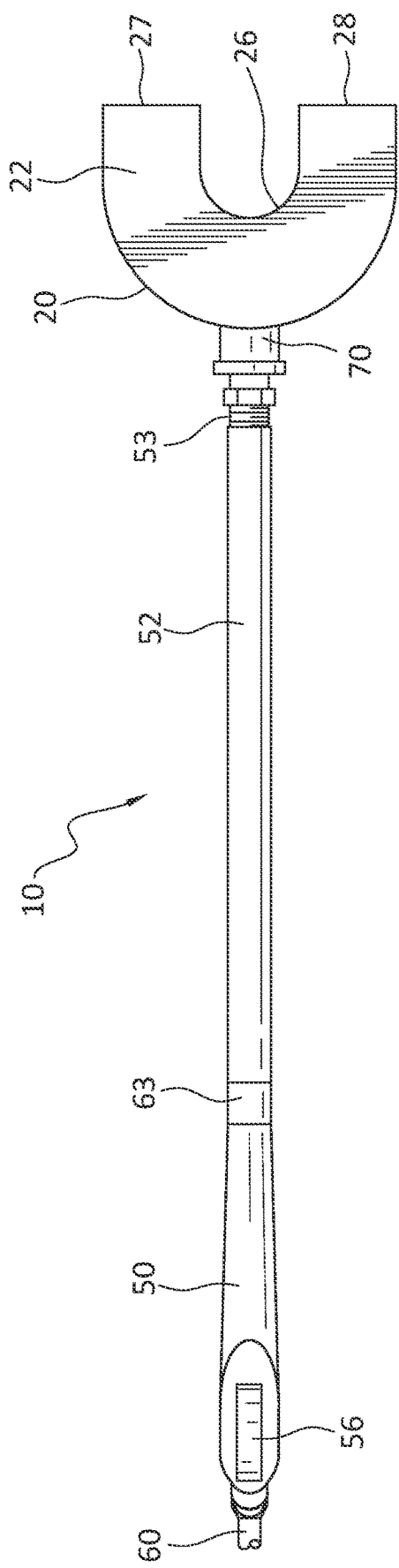
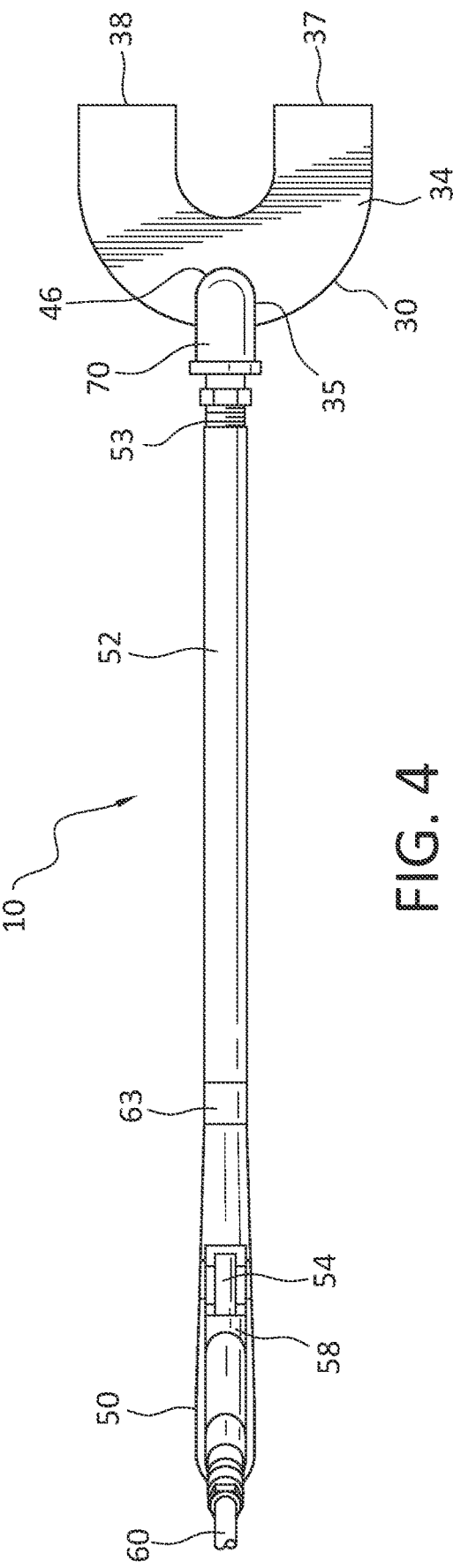
FIG. 3
FIG. 4

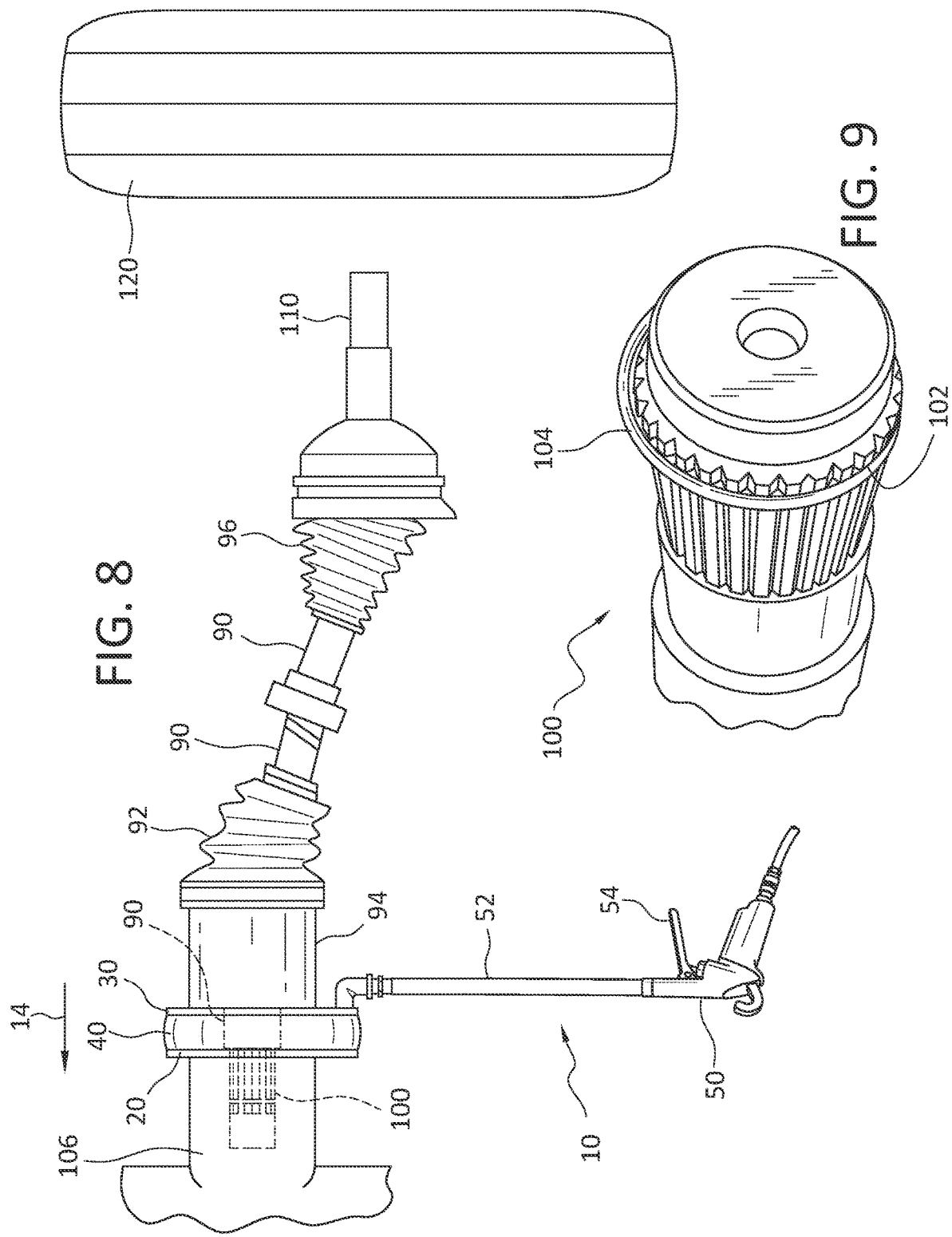

AXLE REMOVAL TOOL AND METHOD

BACKGROUND

Constant velocity (CV) axles in motor vehicles are challenging to remove for inspection, repair or replacement. The inner CV joint is mounted onto a spline 100 to the transaxle, which spline includes a groove 102 that holds a C-clip 104 that extends radially outwardly from the groove to prevent relative axial movement between the CV axle and the transaxle. See FIG. 9. Substantial pulling force is required to overcome the C-clip and pull the CV axle off of the spline and away from the transaxle. The transaxle spline is located in positions of the vehicle drive train that are very difficult for a mechanic to access and apply the necessary pulling force to draw the CV axle away from the transaxle.

Accordingly, improved methods for separating a CV axle from a transaxle spline continue to be sought.

SUMMARY OF THE INVENTION

In one embodiment, an axle removal tool is provided to assist a mechanic to separate a CV axle from a transaxle spline. The axle removal tool has a first plate disposed in facing relation to a second plate. A bellows is arranged between the first plate and the second plate. The bellows is configured to receive compressed air via an intake opening therein. The second plate defines an opening therethrough that is in fluid communication with the intake opening of the bellows. A connector fluidly connects the opening in the second plate to a source of compressed air. As the bellows inflates with air from the source of compressed air, the first plate is pushed away from the second plate.

Before inflating the bellows, the first plate and the second plate and the bellows are inserted between the CV axle housing mount and the transaxle housing mount. As the first plate is pushed from the second plate pushing action of the inflated bellows, the first plate in turn pushes the CV axle away from the transaxle. Sufficient pushing force is applied to overcome the D-ring disposed on the transaxle, so that the CV axle is forced away from the transaxle in the axial direction thereof. The axle removal tool then is disengaged from between CV axle housing mount and the transaxle housing mount. The mechanic then may more easily pull the CV axle away from the transaxle in the axial direction.

In an advantageous embodiment, the first plate, the second plate and the bellows each have a C- or U- or V-shape defining a first leg and a second leg and a gap therebetween. The second plate is positioned in substantially matching registration with the first plate, with the bellows sandwiched therebetween. In this embodiment, the bellows is positioned in substantially matching registration with each of the first plate and the second plate. The axle removal tool then may be inserted by the mechanic between the CV axle housing mount and the transaxle housing mount with the gap between the leg portions of the first plate and the second plate of a predetermined gap opening sufficient to receive the CV axle The axle removal tool may have a trigger configured to selectively open and close a valve that controls the flow of compressed air from the source of compressed air into the connector to the bellows. The axle removal tool may have a handle housing the valve. The handle may include a thumb grip extending from the handle to facilitate gripping the handle while operating the trigger. In an advantageous embodiment, the handle or a component associated with the handle, such as a tube, is removably joined to the connector.

In such embodiment, either the handle or the component associated with the handle has a distal end with first screw threads configured to removably engage with mating screw threads of the connector.

In an alternative embodiment, an axle removal tool has a first plate disposed in facing relation to a second plate with a bladder arranged between the first plate and the second plate. The bladder is configured to receive compressed air via an intake opening therein, and a hose fluidly connects the intake opening of the bladder to a source of compressed air. As the bladder inflates with air from the source of compressed air, the first plate is pushed away from the second plate. The compressed air may be provided either by an air compressor, or may be provided by a hand pump. The first plate, the second plate and the bladder may have a C- or U- or V-shape defining a first leg and a second leg and a gap therebetween. The first plate, second plate and bladder may be arranged in substantially matching registration with one another. The axle removal tool may be inserted between the manifold for an inner CV joint of the CV axle and a housing for a spline of a transaxle so that the CV axle is located in the gaps of the first plate, the second plate and the bladder.

In one variant of the axle removal tool, at least one clip spring is operatively connected to the first plate and to the second plate to urge the first plate and second plate toward one another. The clip spring may be of spring steel bent into an isosceles triangular shape with two sides joined by a bridge. The tension imposed by the bridge forces the two sides closer toward one another. The tension of the clip spring is overcome to separate the two sides thereof when compressed air inflates the bladder. As compressed air evacuates from the bladder, the two arms of the clip spring push the first plate and the second plate to squeeze the opposite surfaces of the bladder.

Another embodiment of the invention is a method for urging a CV axle away from a transaxle of a motor vehicle using the axle removal tool to facilitate removing the CV axle from the motor vehicle for inspection or repair. In the method, at least a portion of the first plate and a portion of the second plate and a portion of the bellows (or bladder) of the axle removal tool are inserted between a manifold or housing for an inner CV joint of the CV axle and a housing for a spline of a transaxle. Upon insertion, the bellows (or bladder) is not inflated. After insertion, the bellows (or bladder) is inflated with compressed air to push the first plate away from the second plate. By such pushing action, the first plate in turn pushes the manifold or housing for the inner CV joint in an axial direction away from the transaxle spline. This pushing force is sufficient to overcome the D-ring present on the transaxle spline.

In a next step of the method, at least a portion of the compressed air is released out of the bellows (or bladder), and the first and second plates and the bellows (or bladder) are extracted out of the vehicle. Because the inner CV joint has been pushed in the axial direction away from the transaxle spline, the CV axle is more easily pulled away from the transaxle spline by a mechanic for inspection, repair or replacement.

In a particularly advantageous embodiment of the method, the axle removal tool is provided with a first plate that is disposed in facing relation to a second plate, and a bellows (or bladder) that is arranged between the first plate and the second plate. In this embodiment, the first and second plates and the bellows (or bladder) have a C- or U- or V-shape defining a first leg and a second leg and a gap therebetween and they are in registration with one another. The axle removal tool may be inserted between the manifold for an inner CV joint of the CV axle and a housing for a spline of a transaxle so that the CV axle is located in the gaps of the first plate, the second plate and the bellows. The bellows (or bladder) is then inflated with compressed air to push the first plate away from the second plate, and in turn to push the manifold or housing of the inner CV joint in an axial direction away from the transaxle spline. After such inflation and pushing, at least a portion of the compressed air is released out of the bellows (or bladder) so that the plates and bellows (or bladder) of the axle removal tool may be extracted from the motor vehicle. If a clip spring is provided, the clip spring urges the first plate and the second plate of the axle removal tool toward one another, pushing upon the bellows (or bladder) to hasten evacuation of the bellows (or bladder).

DESCRIPTION OF THE DRAWINGS

The foregoing summary, as well as the following detailed description of the invention, will be better understood when read in conjunction with the appended drawings. For the purpose of illustrating the invention, the drawings show presently preferred embodiments. However, the invention is not limited to the precise arrangements and instrumentalities shown.

FIG. 3 is a top plan view of the axle removal tool of FIG. 1;

FIG. 4 is a bottom plan view of the axle removal tool of FIG. 1;

FIG. 8 is a rear elevation view of the axle removal tool installed between the inner CV joint housing and the housing for the spline to the transaxle, wherein the wheel assembly has been removed from the CV axle, and wherein the pneumatic piston or bellows is inflated to push the first plate away from the second plate of the axle removal tool by the force of compressed air;

FIG. 9 is a perspective view of the spline to the transaxle after the CV axle assembly has been pulled off;

DETAILED DESCRIPTION OF EMBODIMENTS

Figure 1:
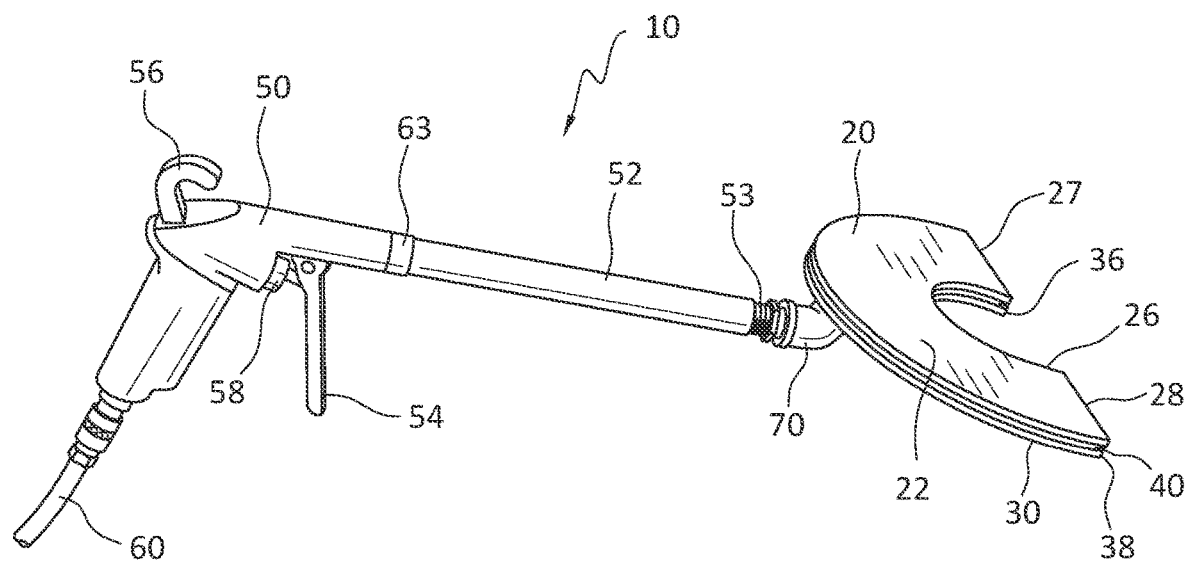
FIG. 1 is right side perspective view of an axle removal tool according to the invention, showing the pneumatic piston or bellows in a non-inflated state.
Figure 2:
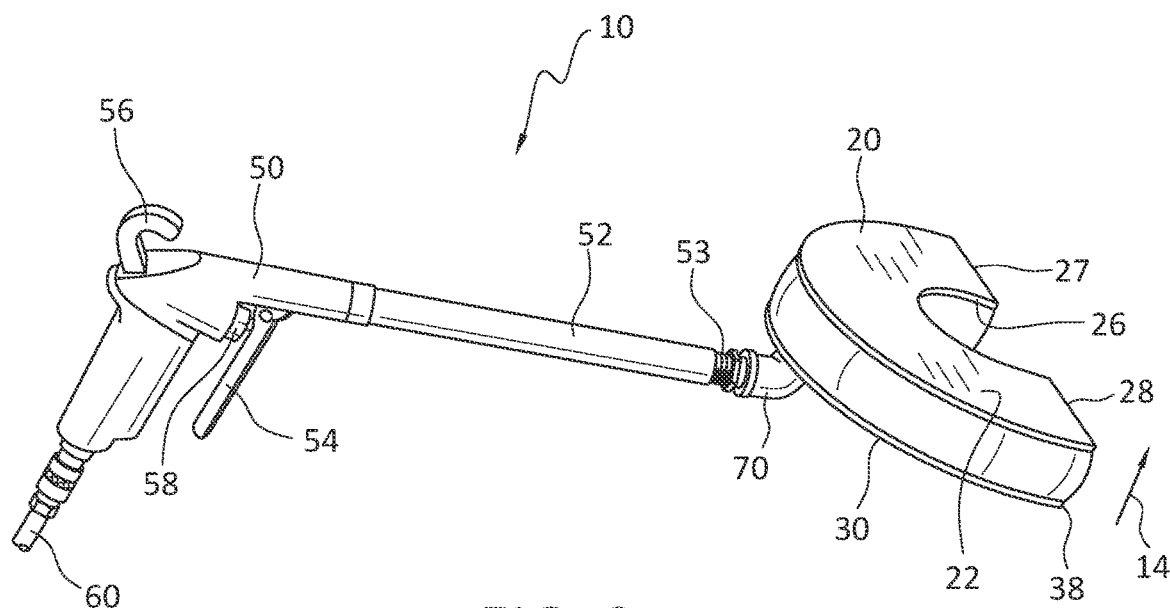
FIG. 2 is a right side perspective view of the axle removal tool of FIG. 1 showing the pneumatic piston or bellows in an inflated state.

Certain terminology is used in the following description for convenience only and is not limiting. The words "lower," "bottom," "upper," "top," "right" and "left" designate directions in the drawings to which reference is made. The words "inwardly," "outwardly," "upwardly" and "downwardly" refer to directions toward and away from, respectively, the geometric center of the axle removal tool and/or of the motor vehicle axle assembly, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Turning in detail to the drawings, FIGS. 1-4 illustrate an axle removal tool 10 according to the invention. The axle removal tool 10 has a first plate 20 and a second plate 30 juxtaposed in facing relation with a bellows 40 or pneumatic piston sandwiched therebetween. The first plate 20 has a top surface 22, a bottom surface 24 opposite the top surface 22 and has a U-shape in plan view with a first leg with a front end 27 and a second leg with a front end 28 and a U-shaped cut-out or gap 26 between the front ends 27, 28. The second plate 30 has a top surface 32, a bottom surface 34 opposite the top surface 32 and has a U-shape in plan view with a first leg with a front end 37 and a second leg with a front end 38 and a U-shaped cut-out or gap 36 between the front ends 37, 38. While shown as having a U-shape, each of the plates 20, 30 may alternatively have a C-shape, V-shape or another suitable shape with a slotted opening between two leg extensions. The first plate 20 and the second plate 30 may be formed of metal, such as machine steel or stainless steel, or of plastic or fiber reinforced polymer composites.

The second plate 30 defines an opening 35 therethrough. A connector or other fitting 70 extends from the bottom surface 34 of the second plate 30 at the opening 35. The fitting 70 is configured to allow passage of a gas, such as air, therethrough, and the fitting 70 is in register with the opening 35 through the second plate 30. The fitting 70 is provided at its distal end with internal screw threads. The fitting 70 may be formed of metal, such as machine steel or stainless steel. The fitting 70 may be formed of the same material as the second plate 30, and may be joined to or integrally formed with the second plate 30.

The bellows 40 or pneumatic piston is positioned between the first plate 20 and the second plate 30. The bottom surface 24 of the first plate 20 is joined or adhered to the top surface of the bellows 40, and the top surface 34 of the second plate 30 is joined or adhered to the bottom surface of the bellows 40. The bellows 40 defines an opening therein that is in registry with the opening 35 of the second plate 30. In the embodiment shown in FIGS. 1-4, the bellows 40 has a U-shaped configuration substantially matching the U-shape of the first plate 20 and the second plate 30. The bellows 40 may be formed of an oiled canvas or rubber laminated cloth, or woven fabrics (natural and/or synthetic) impregnated with neoprene, rubber or plastic to impede air flow, plastic films, polyethylene terephthalate (PET) such as MYLAR, or other suitable material that can withstand repeated folding and unfolding and surface pressures of from 50 psig to 110 psig, more preferably from 80 psig to 90 psig.

The fitting 70 from the second plate 30 is removably joined to a tube 52 that has mating external threads 53 at one end. The opposite end of the tube 52 is joined by threaded connection 63 to a handle 50 that houses a valve 58 to control the introduction of compressed air to the tube 52 and through the fitting 70 into the bellows 40. The valve 58 is opened and closed by trigger 54 with a lever action. The handle 50 has a thumb grip 56 for improved handling and more secure gripping.

The valve 58 is fluidly connected to a connection 60 to a source of compressed gas, such as air or nitrogen. The connection 60 shown in FIGS. 1-4 is a tube that leads to an air compressor that emits air flow at from 50 psig to 110 psig, more preferably from 80 psig to 90 psig.

Figure 5:
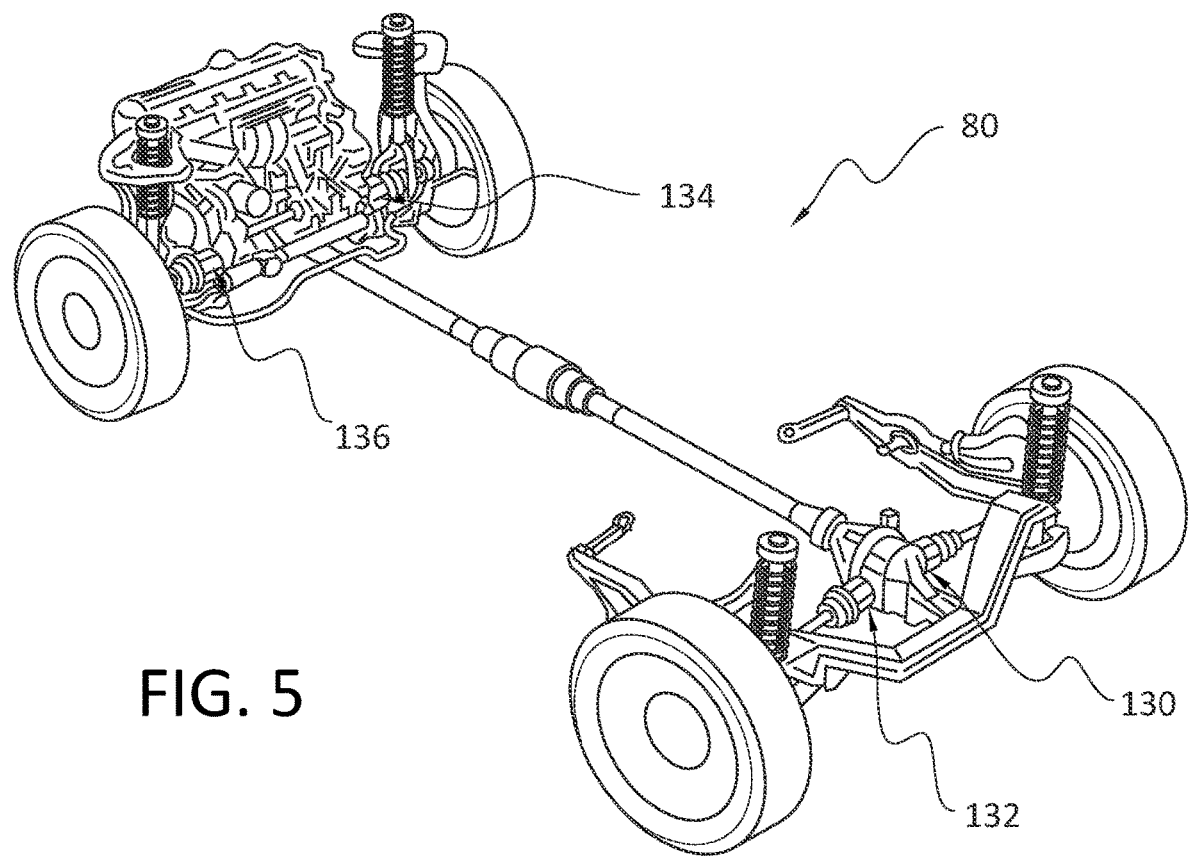
FIG. 5 is a left rear perspective view of the drive train of a motor vehicle showing the front and rear tires and respective CV axle assemblies, with arrows indicating intended insertion locations for the axle removal tool according to the invention.
Figure 6:
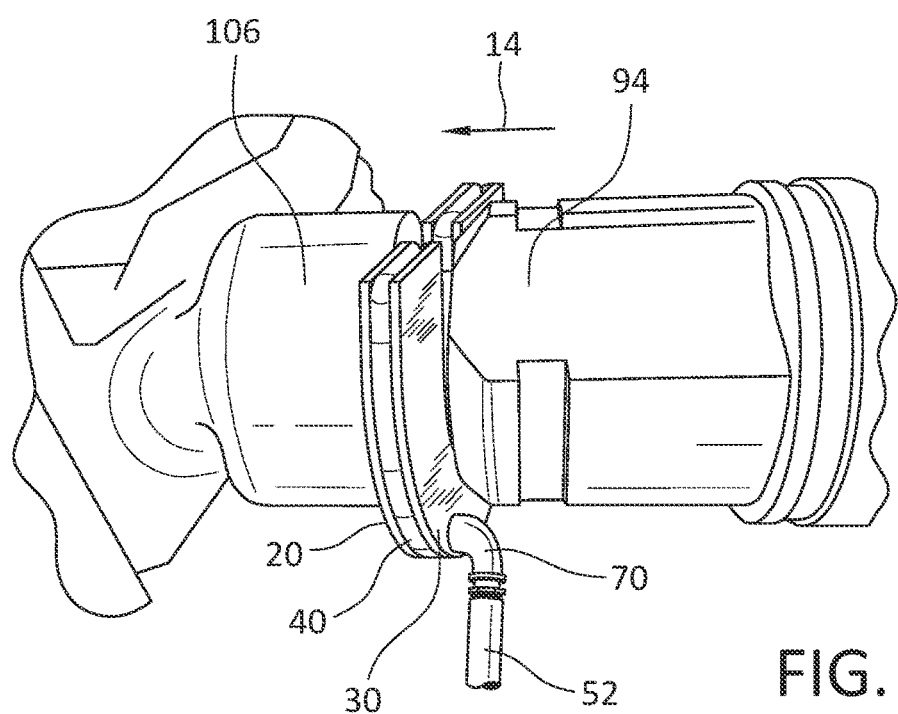
FIG. 6 is a bottom view of the plates and bellows of the axle removal tool installed between the inner CV joint housing and the housing for the spline to the transaxle.
Figure 7:
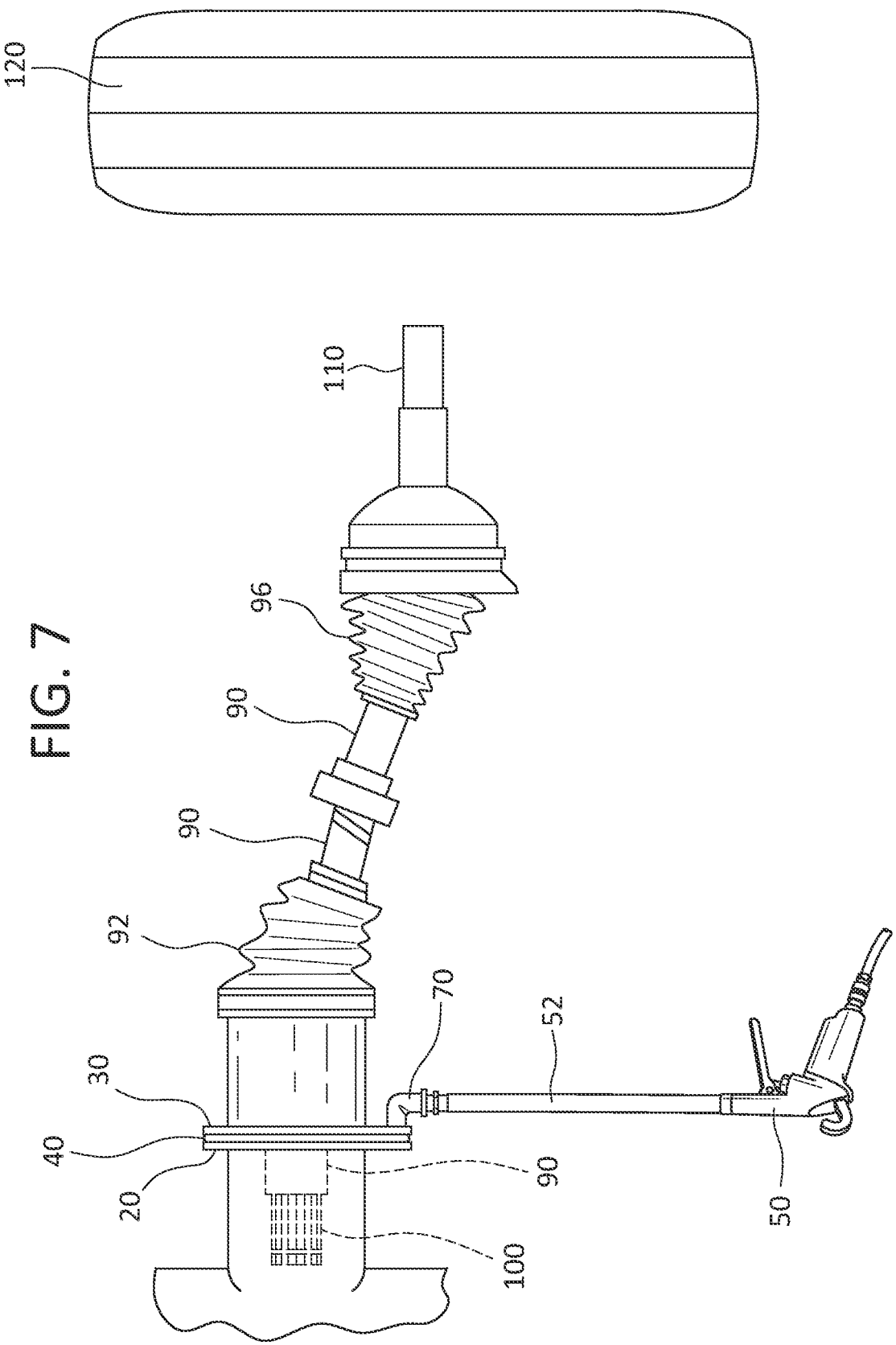
FIG. 7 is a rear elevation view of the axle removal tool installed between the inner CV joint housing and the housing for the spline to the transaxle, wherein the wheel assembly has been removed from the CV axle, and wherein the pneumatic piston or bellows is not yet inflated.

FIG. 5 shows a vehicle drive train 80 with four tires 120 mounted onto respective CV axles. Arrows 130, 132, 134, 136 indicate suitable locations for inserting the axle removal tool 10 to remove the individual CV axles 90 from the transaxles. One of the CV axles 90 is shown in FIGS. 6-8 with its vehicle tire 120 removed. The CV axle 90 components include an inner CV joint 92, a housing 94 for the inner CV joint 92, an outer CV joint 96, and a tire axle 110.

FIGS. 6-8 show a method for urging a CV axle away from a transaxle of a motor vehicle using the axle removal tool 10. If the motor vehicle has a vehicle drive train 80 comparable to that of FIG. 5, the axle removal tool 10 is to be inserted into a selected location such as one of the locations indicated by arrows 130, 132, 134, 136.

In a first step, as shown in FIG. 7, the first plate 20, second plate 30 and bellows 40 of the axle removal tool 10 are inserted between the housing for the inner CV joint 92 and the housing 106 for the spline 100 to the transaxle. The gaps between the front ends of the leg portions 27, 28, 37, 38 of the U-shaped plates 20, 30 and the corresponding U-opening of the bellows 40 are positioned around the CV axle 90. Upon insertion, the bellows 40 is not inflated with compressed air. See FIG. 7.

As the second step, the trigger 54 of the axle removal tool 10 is activated to open the valve 58 to direct compressed air or other inert gas through the handle 50 and the extending tube 52, and through the fitting 70 into the bellows 40. As the bellows 40 inflates, it acts pneumatically on the first plate 20 to push the first plate 20 away from the second plate 30 in the direction of arrow 14 (FIGS. 6 and 8) and in turn to force the CV axle mount in an axial direction away from the transaxle spline 100. In the embodiment shown in FIG. 8, the first plate 20 is separated from the second plate 30 by a distance of about one to three inches, more preferably about two inches, corresponding in part to the inflated height of the bellows 40. The compressed air or other inert gas is at a pressure from 50 psig to 110 psig, more preferably from 80 psig to 90 psig. The pushing force exerted by the combination of the bellows 40 and the plates 20, 30 overcomes the C-clip 104 securing the spline 100 to the CV axle mounting. See FIG. 9. The CV axle mounting is thus urged axially away from the spline 100 of the transaxle by a distance corresponding to the separation distance of the first plate 20 and the second plate 30.

The trigger 54 is then deactivated, and at least a portion of the compressed air or other gas is released from the bellows 50. The axle removal tool 10 can then be removed from the vehicle. Alternatively, the axle removal tool 10 may be removed from the vehicle while the bellows 50 is still inflated by compressed air or other gas.

With the CV axle mounting having been pushed apart from the transaxle spline 100, the CV axle now can more readily be separated from the transaxle by the mechanic. While it is envisioned that the axle removal tool 10 will be removed from the vehicle before separating the CV axle from the transaxle, it is contemplated that the tool 10 could remain in place until the mechanic has separated the CV axle.

Figure 10:
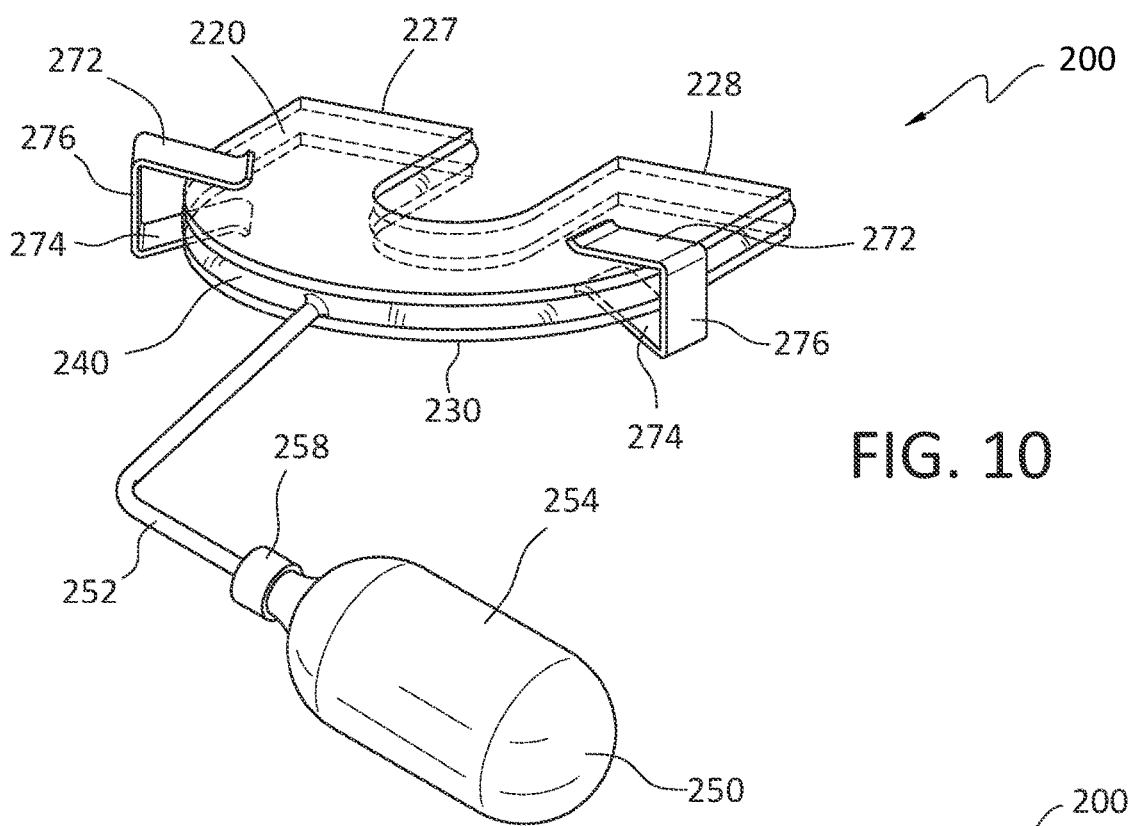
FIG. 10 is a right rear perspective view of an alternative embodiment of an axle removal tool according to the invention showing the pneumatic piston or bladder in a non-inflated state.
Figure 11:
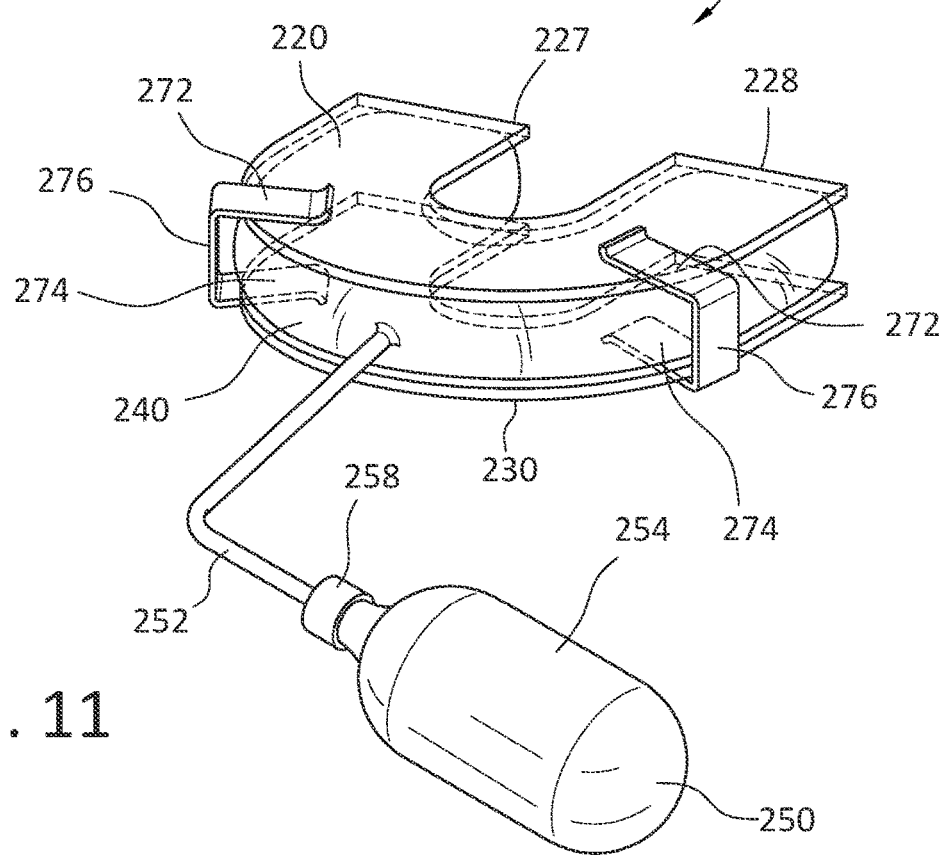
FIG. 11 is a right rear perspective view of the axle removal tool of FIG. 10 showing the pneumatic piston or bladder in an inflated state.

FIGS. 10 and 11 illustrate an alternative embodiment of the axle removal tool 200. In this alternative embodiment, a first plate 220 and a second plate 230 are juxtaposed in facing relation with a bladder 240 or pneumatic piston sandwiched therebetween. The first plate 220 has a top surface 222, a bottom surface 224 opposite the top surface 222 and has a U-shape in plan view with a first leg with a front end 227 and a second leg with a front end 228 and a U-shaped cut-out or gap 226 between the front ends 227, 228. The second plate 230 has a top surface 232, a bottom surface 234 opposite the top surface 232 and has a U-shape in plan view with a first leg with a front end 237 and a second leg with a front end 238 and a U-shaped cut-out or gap 236 between the front ends 237, 238. While shown as having a U-shape, each of the plates 220, 230 may alternatively have a C-shape, V-shape or another suitable shape with a slotted opening between two leg extensions. The first plate 220 and the second plate 230 may be formed of metal, such as machine steel or stainless steel, or of plastic or fiber reinforced polymer composites.

The bladder 240 or pneumatic piston is positioned between the first plate 220 and the second plate 230. The bottom surface 224 of the first plate 220 is joined or adhered to the top surface of the bladder 240, and the top surface 234 of the second plate 230 is joined or adhered to the bottom surface of the bladder 240. The bladder 240 defines an opening therein that is in fluid communication with a hose 252 or tube that is directly or indirectly connected to a source of compressed air. In the embodiment shown in FIGS. 10 and 11, the bladder 240 has a U-shaped configuration substantially matching the U-shape of the first plate 220 and the second plate 230. The bladder 240 may be formed of an oiled canvas or rubber laminated cloth, or woven fabrics (natural and/or synthetic) impregnated with neoprene, rubber or plastic to impede air flow, plastic films, polyethylene terephthalate (PET) such as MYLAR, or other suitable material that can withstand repeated folding and unfolding and surface pressures of from 50 psig to 110 psig, more preferably from 80 psig to 90 psig.

In the embodiment of FIGS. 10 and 11, a hand pump 250 is in fluid communication with the hose 252 or tube. The hand pump 250 has a squeeze bulb 254 that may be squeezed by a mechanic or other person to compress air within the bulb 254 to overcome the valve 258 that fluidly connects the hand pump 250 to the bladder 240. Alternatively, comparable to the embodiment shown in FIGS. 1-4, the hose 252 may be joined to a handle with a trigger mechanism and to a compressor as the source of compressed gas, such as air or nitrogen.

In the embodiment of FIGS. 10 and 11, a clip spring 270 has a first arm 272 and a second arm 274 that are joined together by a bridge 276 to form an isosceles triangle. The tensioning force from the bridge 276 urges the ends of the first arm 272 and the second arm 274 of the clip spring 270 toward one another. The first arm 272 may be joined or placed in contact with the top surface 222 of the first plate 220 and the second arm 274 may be joined or placed in contact with the bottom surface 234 of the second plate 230. With the clip spring 270 so positioned, the first plate 220 and the second plate 230 are urged toward one another. This clamping force assists to evacuate compressed air or gas out of the bladder 240. The clip spring 270 clamping force is overcome when sufficient compressed air is introduced into the bladder 240 to inflate the bladder 240 and the gas pressure therein. The inflated bladder 240 pushes the first plate 220 and the second plate 230 apart from one another. Optionally, two or more clip springs 270 may be installed onto the first plate 220 and the second plate 230 to optimize the compressing force applied onto the outer surfaces 222, 234 of the plates 220, 230.

The alternative embodiment of the axle removal tool 200 shown in FIGS. 10 and 11 is intended for use in the same locations of the vehicle drive train 80 as described above with the axle removal tool 10. The first plate 220, second plate 230 and bellows 240 of the axle removal tool 200 may be inserted between the housing for the inner CV joint 92 and the housing 106 for the spline 100 to the transaxle. The gaps between the front ends of the leg portions 227, 228, 237, 238 of the U-shaped plates 220, 320 and the corresponding U-opening of the bladder 240 are positioned around the CV axle 90. Upon insertion, the bladder 240 is not inflated with compressed air. Upon inflation with compressed air (or other gas), the bladder 240 acts pneumatically on the first plate 220 and the second plate 230 to push the plates 220, 230 away from one another, and in turn to force the CV axle mount in an axial direction away from the transaxle spline 100. Then, the bladder 240 may be at least partially evacuated of air so that the first plate 220 and the second plate 230 and the bladder 240 of the tool 200 can be extracted from the vehicle drive train 80.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

REFERENCE NUMERAL LISTING 10 axle removal tool
14 arrow showing direction of plate separation
20 first plate
22 top surface of first plate
24 bottom surface of first plate
26 U-shaped cut out
27 front end of first leg portion of first plate
28 front end of second leg portion of first plate
30 second plate
32 top surface of second plate
34 bottom surface of second plate
35 opening in bottom surface of second plate
36 U-shaped cut out
37 front end of first leg portion of second plate
38 front end of second leg portion of second plate
40 bellows/pneumatic piston
42 U-shaped compartment of bellows
46 opening in bellows
50 handle
52 tube extending from handle
53 externally threaded end
54 trigger
56 thumb clip
58 valve
60 connection to source of compressed air/gas
63 externally threaded end
70 fitting
80 vehicle drive train
90 CV axle
92 inner CV joint
94 housing or manifold for inner CV joint
96 outer CV joint
100 spline to transaxle
102 groove
104 C-clip in groove of spline
106 housing for spline of transaxle
120 vehicle tire
130 arrow showing suitable location to insert axle removal tool
132 arrow showing suitable location to insert axle removal tool
134 arrow showing suitable location to insert axle removal tool
136 arrow showing suitable location to insert axle removal tool
200 axle removal tool
220 first plate
222 top surface of first plate
224 bottom surface of first plate
226 U-shaped cut out
227 front end of first leg portion of first plate
228 front end of second leg portion of first plate
230 second plate
232 top surface of second plate
234 bottom surface of second plate
236 U-shaped cut out
237 front end of first leg portion of second plate
238 front end of second leg portion of section plate
240 bladder/pneumatic piston
242 U-shaped pillow
246 opening in bladder to receive compressed air
250 hand pump
252 hose or tube connecting hand pump to bladder
254 squeeze bulb of hand pump
258 valve for compressed air
270 clip spring
272 first arm of clip spring
274 second arm of clip spring
276 bridge joining and tensioning arms of clip spring

The invention claimed is:

1. An axle removal tool, comprising:
a first plate disposed in facing relation to a second plate, wherein the first plate has a C- or U- or V-shape defining a first leg and a second leg and a gap therebetween and the second plate has a C- or U- or V-shape defining a first leg and a second leg and a gap therebetween in substantially matching registration with the first plate;
a bellows arranged between the first plate and the second plate, wherein the bellows has a C- or U- or V-shape defining a first leg and a second leg and a gap therebetween in substantially matching registration with the first plate, said bellows having a compressed state when uninflated so that the first plate and the second plate are separated by a first distance, and having an expanded state when inflated so that the first plate and the second plate are separated by a second distance that is greater than the first distance, said bellows configured to receive compressed air via an intake opening therein to inflate the bellows to the expanded state, wherein said second plate defines an opening therethrough that is in fluid communication with the intake opening of the bellows;

a connector to fluidly connect the opening in the second plate to a source of compressed air; and a clip spring operatively connected to the first plate and the second plate and configured to apply a spring force to continually urge the first plate and second plate toward one another so as to bias the bellows against inflation both when the bellows is in the compressed state and when the bellows is in the expanded state;

wherein as the bellows inflates with air from the source of compressed air, the first plate is pushed away from the second plate to overcome the spring force of the clip spring so that the first plate is spaced from the second plate by the second distance.

2. The axle removal tool of claim 1, further comprising a trigger configured to selectively open and close a valve that controls the flow of compressed air from the source of compressed air into the connector.

3. The axle removal tool of claim 2, further comprising a handle housing the valve.

4. The axle removal tool of claim 3, wherein the handle or a component associated with the handle is removably joined to the connector.

5. The axle removal tool of claim 3, wherein the handle or a component associated with the handle has a distal end with first screw threads configured to removably engage with mating second screw threads of the connector.

6. The axle removal tool of claim 3, further comprising a tube joining the handle to the connector.

7. The axle removal tool of claim 2, further comprising a handle housing the valve, wherein the trigger extends from the handle, and wherein a thumb grip extends from the handle.

8. A method for urging a CV axle away from a transaxle of a motor vehicle using the axle removal tool of claim 1, comprising:

inserting a portion of the first plate, a portion of the second plate and a portion of the bellows of the axle removal tool between a manifold for an inner CV Joint of the CV axle and a housing for a spline of the transaxle; and inflating the bellows with compressed air to push the first plate away from the second plate.

9. The method of claim 8, further comprising:

releasing at least a portion of the compressed air out of the bellows.

10. The method of claim 8, wherein the bellows is inflated only after inserting the portions of the first plate, the second plate and the bellows between the manifold for the inner CV joint and the housing for the spline of the transaxle.

11. The method of claim 8, further comprising removing the axle removal tool from the motor vehicle.

* * * * *